United States Patent
Chronis et al.

(10) Patent No.: US 11,276,181 B2
(45) Date of Patent: *Mar. 15, 2022

(54) SYSTEMS AND METHODS FOR USE IN DETECTING FALLS UTILIZING THERMAL SENSING

(71) Applicant: FORESITE HEALTHCARE, LLC, St. Louis, MO (US)

(72) Inventors: George Chronis, St. Louis, MO (US); Erik Stone, Columbia, MO (US); Mark Schaumburg, Kirkwood, MO (US)

(73) Assignee: FORESITE HEALTHCARE, LLC, St. Louis, MO (US)

( * ) Notice: Subject to any disclaimer, the term of this patent is extended or adjusted under 35 U.S.C. 154(b) by 120 days.

This patent is subject to a terminal disclaimer.

(21) Appl. No.: 16/655,915

(22) Filed: Oct. 17, 2019

(65) Prior Publication Data
US 2020/0051251 A1 Feb. 13, 2020

Related U.S. Application Data

(63) Continuation of application No. 15/634,520, filed on Jun. 27, 2017, now Pat. No. 10,453,202.
(Continued)

(51) Int. Cl.
*G06K 9/00* (2006.01)
*G06T 7/215* (2017.01)
(Continued)

(52) U.S. Cl.
CPC .......... *G06T 7/215* (2017.01); *G06K 9/00369* (2013.01); *G06K 9/00771* (2013.01);
(Continued)

(58) Field of Classification Search
CPC . G06T 2207/10028; G06T 2207/10048; G06T 2207/30196; G06T 2207/30232; G06T 7/215; G06T 7/194; G06T 7/20
See application file for complete search history.

(56) References Cited

U.S. PATENT DOCUMENTS

| 4,320,766 A | 3/1982 | Alihanka et al. |
| 5,097,841 A | 3/1992 | Moriuchi et al. |

(Continued)

FOREIGN PATENT DOCUMENTS

| CN | 2394612 Y | 9/2000 |
| CN | 2477135 Y | 2/2002 |

(Continued)

OTHER PUBLICATIONS

International Search Report, International Patent Application No. PCT/US2017/039529, dated Aug. 23, 2017 (9 pages).
(Continued)

*Primary Examiner* — Shaghayegh Azima
(74) *Attorney, Agent, or Firm* — Lewis Rice LLC

(57) ABSTRACT

Systems and methods designed to detect a human being falling as opposed to an inanimate object. Generally, the systems and methods will utilize a depth camera, which will often image in the NIR spectrum to detect a falling object. The portion detected as a falling object will often be detected as separating from a point cloud indicative of one object in contact with another. Should such a separation be detected, the systems and methods will utilize a thermal sensor, often a camera imaging in the LWIR spectrum, to determine if the falling portion has a heat signature indicative of a human being.

8 Claims, 1 Drawing Sheet

Related U.S. Application Data

(60) Provisional application No. 62/355,728, filed on Jun. 28, 2016.

(51) Int. Cl.
   *G06T 7/194* (2017.01)
   *G06T 7/11* (2017.01)
   *G06T 7/20* (2017.01)

(52) U.S. Cl.
   CPC ............... *G06T 7/11* (2017.01); *G06T 7/194* (2017.01); *G06T 7/20* (2013.01); *G06T 2207/10016* (2013.01); *G06T 2207/10028* (2013.01); *G06T 2207/10048* (2013.01); *G06T 2207/30196* (2013.01); *G06T 2207/30232* (2013.01)

(56) References Cited

U.S. PATENT DOCUMENTS

| | | | |
|---|---|---|---|
| 5,309,921 A | 5/1994 | Kisner et al. | |
| 5,844,488 A | 12/1998 | Musick | |
| 6,002,994 A | 12/1999 | Lane et al. | |
| 6,915,008 B2 | 7/2005 | Barman et al. | |
| 7,420,472 B2 | 9/2008 | Tran | |
| 7,502,498 B2 | 3/2009 | Wen et al. | |
| 7,786,874 B2 | 8/2010 | Rodgers | |
| 7,843,351 B2 | 11/2010 | Bourne et al. | |
| 8,287,452 B2 | 10/2012 | Young et al. | |
| 8,444,558 B2 | 5/2013 | Young et al. | |
| 8,547,236 B2 | 10/2013 | Gannot et al. | |
| 8,723,677 B1 | 5/2014 | Kiani | |
| 8,727,981 B2 * | 5/2014 | Bechtel | A61M 21/02 600/301 |
| 9,129,506 B1 | 9/2015 | Kusens | |
| 9,510,784 B2 | 12/2016 | Benson et al. | |
| 9,538,158 B1 * | 1/2017 | Rush | A61B 5/1115 |
| 9,741,227 B1 | 8/2017 | Kusens | |
| 9,782,108 B2 | 10/2017 | Shimizu | |
| 9,795,321 B2 | 10/2017 | Shimizu | |
| 9,866,797 B2 | 1/2018 | Clark et al. | |
| 10,078,951 B2 | 9/2018 | Kusens | |
| 10,206,630 B2 | 2/2019 | Stone et al. | |
| 2001/0020395 A1 | 9/2001 | Hubbard, Jr. | |
| 2003/0058111 A1 | 3/2003 | Lee et al. | |
| 2003/0059081 A1 | 3/2003 | Trajkovic | |
| 2003/0085992 A1 | 5/2003 | Arpa et al. | |
| 2004/0030531 A1 | 2/2004 | Miller et al. | |
| 2004/0119716 A1 | 6/2004 | Park et al. | |
| 2004/0183679 A1 * | 9/2004 | Paximadis | G08B 13/19 340/567 |
| 2004/0228503 A1 | 11/2004 | Cutler | |
| 2005/0088515 A1 | 4/2005 | Geng | |
| 2005/0094879 A1 | 5/2005 | Harville | |
| 2005/0124864 A1 | 6/2005 | Mack et al. | |
| 2005/0190062 A1 | 9/2005 | Sullivan et al. | |
| 2006/0042409 A1 | 3/2006 | Nemoto | |
| 2006/0055543 A1 | 3/2006 | Ganesh et al. | |
| 2006/0152378 A1 | 7/2006 | Lokhorst et al. | |
| 2007/0003146 A1 | 1/2007 | Ko et al. | |
| 2007/0085690 A1 | 4/2007 | Tran | |
| 2007/0152837 A1 | 7/2007 | Bischoff et al. | |
| 2007/0262247 A1 | 11/2007 | Becerra et al. | |
| 2007/0263900 A1 | 11/2007 | Medasani et al. | |
| 2007/0268480 A1 | 11/2007 | Kaye | |
| 2008/0077020 A1 * | 3/2008 | Young | A61B 5/0205 600/484 |
| 2008/0117060 A1 | 5/2008 | Cuddihy et al. | |
| 2008/0169931 A1 | 7/2008 | Gentry et al. | |
| 2009/0079559 A1 | 3/2009 | Dishongh et al. | |
| 2009/0079813 A1 | 3/2009 | Hildreth | |
| 2009/0089089 A1 | 4/2009 | Jang et al. | |
| 2009/0141124 A1 | 6/2009 | Liu et al. | |
| 2009/0178199 A1 | 7/2009 | Brauers et al. | |
| 2009/0243833 A1 | 10/2009 | Huang et al. | |
| 2010/0049095 A1 | 2/2010 | Bunn et al. | |
| 2010/0152546 A1 * | 6/2010 | Behan | A61B 5/4809 600/301 |
| 2010/0163315 A1 | 7/2010 | York et al. | |
| 2010/0171622 A1 | 7/2010 | Brauers et al. | |
| 2010/0256512 A1 | 10/2010 | Sullivan | |
| 2010/0302043 A1 | 12/2010 | Skubic et al. | |
| 2010/0330543 A1 | 12/2010 | Black et al. | |
| 2011/0054330 A1 | 3/2011 | Pfeiffer et al. | |
| 2011/0087113 A1 | 4/2011 | Mack et al. | |
| 2011/0306844 A1 | 12/2011 | Young | |
| 2011/0308015 A1 | 12/2011 | Newham | |
| 2012/0019643 A1 | 1/2012 | Gideon et al. | |
| 2012/0053423 A1 | 3/2012 | Kenalty et al. | |
| 2012/0101411 A1 | 4/2012 | Hausdorff et al. | |
| 2012/0123279 A1 | 5/2012 | Brueser et al. | |
| 2012/0130202 A1 | 5/2012 | Jain | |
| 2012/0172681 A1 | 7/2012 | Sun et al. | |
| 2012/0253201 A1 | 10/2012 | Reinhold | |
| 2012/0327218 A1 * | 12/2012 | Baker | G06K 9/00362 348/135 |
| 2013/0127620 A1 * | 5/2013 | Siebers | G06K 9/00302 340/573.1 |
| 2013/0267791 A1 * | 10/2013 | Halperin | A61B 5/6892 600/300 |
| 2013/0342691 A1 * | 12/2013 | Lewis | H04N 5/23209 348/143 |
| 2014/0022081 A1 * | 1/2014 | Ribble | A61B 5/6892 340/573.4 |
| 2014/0139616 A1 * | 5/2014 | Pinter | A61B 5/742 348/14.08 |
| 2014/0303460 A1 | 10/2014 | Corley et al. | |
| 2014/0307056 A1 * | 10/2014 | Collet Romea | G06T 7/11 348/47 |
| 2015/0094597 A1 * | 4/2015 | Mestha | A61B 5/1128 600/473 |
| 2015/0112151 A1 * | 4/2015 | Muhsin | A61B 5/0013 600/301 |
| 2015/0164238 A1 * | 6/2015 | Benson | A47C 31/00 340/540 |
| 2015/0199892 A1 * | 7/2015 | Johnson | G08B 21/0476 348/77 |
| 2015/0323388 A1 * | 11/2015 | Kostic | A61G 7/0528 250/338.1 |
| 2016/0140827 A1 * | 5/2016 | Derenne | A61B 5/747 340/573.7 |
| 2016/0150966 A1 * | 6/2016 | Heinrich | G06T 7/215 600/476 |
| 2016/0203694 A1 * | 7/2016 | Hogasten | G08B 21/0476 348/164 |
| 2016/0206216 A1 * | 7/2016 | Kirenko | A61B 5/14551 |
| 2016/0267327 A1 * | 9/2016 | Franz | G08B 21/0263 |
| 2017/0024874 A1 * | 1/2017 | Pang | G06K 9/00771 |
| 2017/0049366 A1 * | 2/2017 | Matsumoto | H04N 5/232933 |
| 2017/0053401 A1 * | 2/2017 | Hata | G06K 9/52 |
| 2017/0055888 A1 * | 3/2017 | Matsumoto | H04N 5/23296 |
| 2017/0109391 A1 * | 4/2017 | Rosen | G06F 16/285 |
| 2017/0330044 A1 * | 11/2017 | Telpaz | B60K 35/00 |
| 2017/0344832 A1 * | 11/2017 | Leung | G06K 9/00342 |
| 2018/0192007 A1 | 7/2018 | Clark et al. | |
| 2018/0192923 A1 | 7/2018 | Fu et al. | |

FOREIGN PATENT DOCUMENTS

| | | |
|---|---|---|
| CN | 101499106 A | 8/2009 |
| CN | 101953740 A | 1/2011 |
| CN | 202101963 U | 1/2012 |
| DE | 10305289 A1 | 8/2004 |
| DE | 102008011142 A1 | 8/2009 |
| DE | 102008058781 A1 | 6/2010 |
| FR | 2865032 A1 | 7/2005 |
| GB | 2445760 A1 | 7/2008 |
| HR | P20041063 A9 | 6/2007 |
| JP | 2006288932 A | 10/2006 |
| NL | 8701288 A | 1/1989 |
| WO | 2008048078 A1 | 4/2008 |
| WO | 2013033524 A2 | 3/2013 |

(56) References Cited

FOREIGN PATENT DOCUMENTS

| WO | 2013058985 A1 | 4/2013 |
|---|---|---|
| WO | 2013066601 A1 | 5/2013 |
| WO | 2015055312 A1 | 4/2015 |

OTHER PUBLICATIONS

European Search Report, European Application No. EP 17821085, dated Nov. 6, 2019 (10 pages).
Skala, Karolj et al., "4D Thermal Imaging System for Medical Applications," Periodicum Biologorum, vol. 113, No. 4, pp. 407-416, Nov. 2011, UDC 57:61, CODEN PDBIAD ISSN 0031-5362, retrieved from internet on Jul. 26, 2016, http://hrcak.srce.hr/76970?lang=en (10 pages).
Kepski, Michal et al., "Unobtrusive Fall Detection at Home Using Kinect Sensor," R. Wilson et al. (Eds.): CAIP 2013, Part I, LNCS 8047, pp. 457-464, dated Aug. 27, 2013 (8 pages).
Wikipedia webpage, "Thermographic camera," https://en.wikipedia.org/w/index.php?title=Thermographic_camera&oldid=616310920, updated Jul. 10, 2014, printed on Aug. 12, 2015 (8 pages).
Skubic, Marjorie, "Testing Non-Wearable Fall Detection Methods in the Homes of Older Adults," 2016 38th Annual International Conference of the IEEE Engineering in Medicine and Biology Society (EMBC), IEEE, Aug. 16, 2016, pp. 557-560, printed on Oct. 13, 2016 (4 pages).
Anderson, D., et al., "Recognizing Falls from Silhouettes," Proceedings of the 28th IEEE, Engineering in Medicine and Biology Society Annual International Conference, New York City, USA, Aug. 30-Sep. 3, 2006, pp. 3388-6391.
Bujnoch, Z., "Video Games and Healthcare: Bridging the Gap between Patient and Consumer," Mastering the Art and Science of Patient Adherence, Dec. 19, 2011, 3 pages.
Davis, J., et al., "Toward 3-D Gesture Recognition," Research supported by the National Science Foundation grants CDA-9200369, IRI-9122006 and IRI-9220768, Feb. 2004, 16 pages.
Harvey, N., et al., "Speedup of Fuzzy Logic through Stream Processing on Graphics Processing Units," In Proceedings: IEEE Congress on Evolutionary Computation, 2008, pp. 3809-3814.
Heise, D., et al., "Monitoring Pulse and Respiration with a Non-Invasive Hydraulic Bed Sensor," 32nd Annual International Conference of the IEEE Engineering in Medicine and Biology Society, Buenos Aires, Argentina, Aug. 31-Sep. 4, 2010, pp. 2119-2123.
Heise, D., et al., "Refinement and Evaluation of a Hydraulic Bed Sensor," 33rd Annual International Conference of the IEEE Engineering in Medicine and Biology Society, Boston, Massachusetts, USA, Aug. 30-Sep. 3, 2011, pp. 4356-4360.
Mack, D. C., et al., "Development and Preliminary Validation of Heart Rate and Breathing Rate Detection Using a Passive, Ballistocardiography-Based Sleep Monitoring System," IEEE Transactions on Information Technology in Biomedicine, Jan. 2009, pp. 111-120, vol. 13, No. 1.
Martin, M., et al., "Gait Initiation in Community-Dwelling Adults with Parkinson Disease: Comparison with Older and Younger Adults without the Disease," Physical Therapy, Jun. 2002, pp. 566-577, vol. 82, No. 6, from <www.physther.org>.
ProHeMon, Proactive Health Monitoring: Final report of the research project in the Academy of Finland Proactive computing research program, Feb. 3, 2006, Tampere University of Technology, Institute of Signal Processing and Tampere University Hospital, Department of Clinical Physiology, Web, Retrieved from: http://www.cs.tut.fi/~varri/prohemon/profina4.com, 14 pages.
Rosales, L., et al., "Exploring Passive Heartbeat Detection Using a Hydraulic Bed Sensor System," A Thesis presented to the Faculty of the Graduate School University of Missouri-Columbia, Columbia, Missouri, USA, Dec. 2011, 172 pages.
Rosales, L., et al., "Heartbeat Detection from a Hydraulic Bed Sensor Using a Clustering Approach," 34th Annual International Conference of the IEEE Engineering in Medicine and Biology Society, San Diego, California, USA, Aug. 2B-Sep. 1, 2012, pp. 2383-2387.
Shin, J. H., et al., "Automatic Ballistocardiogram (BCG) Beat Detection Using a Template Matching Approach," 30th Annual International IEEE Engineering in Medicine and Biology Society Conference, Vancouver, British Columbia, Canada, Aug. 20-24, 2008, pp. 1144-1146.
Sledge, I. J., et al., "Emergent Trend Detection in Diurnal Activity," 30th Annual International IEEE Engineering in Medicine and Biology Society Conference, Vancouver, British Columbia, Canada, Aug. 20-24, 2008, pp. 3815-3818.
Wall, J. C., et al., "The Timed Get-up-and-go Test Revisited: Measurement of the Component Tasks," Department of Veterans Affairs, Journal of Rehabilitation Research and Development, Jan./Feb. 2000, pp. 109-114, vol. 37, No. 1.
Wang, F., et al., "Development of a PVDF Piezopolymer Sensor for Unconstrained In-Sleep Cardiorespiratory Monitoring," Journal of Intelligent Material Systems and Structures, Mar. 2003, pp. 185-190, vol. 14, Issue 3.
Watanabe, K., et al., "Noninvasive Measurement of Heartbeat, Respilalion, Snoring and Body Movement of a Subject in Bed via Pneumatic Method," IEEE Transactions on Biomedical Engineering, Dec. 2005, pp. 2100-2107, vol. 52, No. 12.
Yaguchi, S., et al., "Arbitrary Viewpoint Video Synthesis from Multiple Uncalibrated Cameras," IEEE Transactions on Systems, Man, and Cybernetics—Part B: Cybernetics, Feb. 2004, pp. 430-439, vol. 34, No. 1.
Zhu, X., et al., "Real-Time Monitoring of Respilalion Rhythm and Pulse Rate During Sleep," IEEE Transactions on Biomedical Engineering, Dec. 2006, pp. 2553-2563, vol. 53, No. 12.

\* cited by examiner

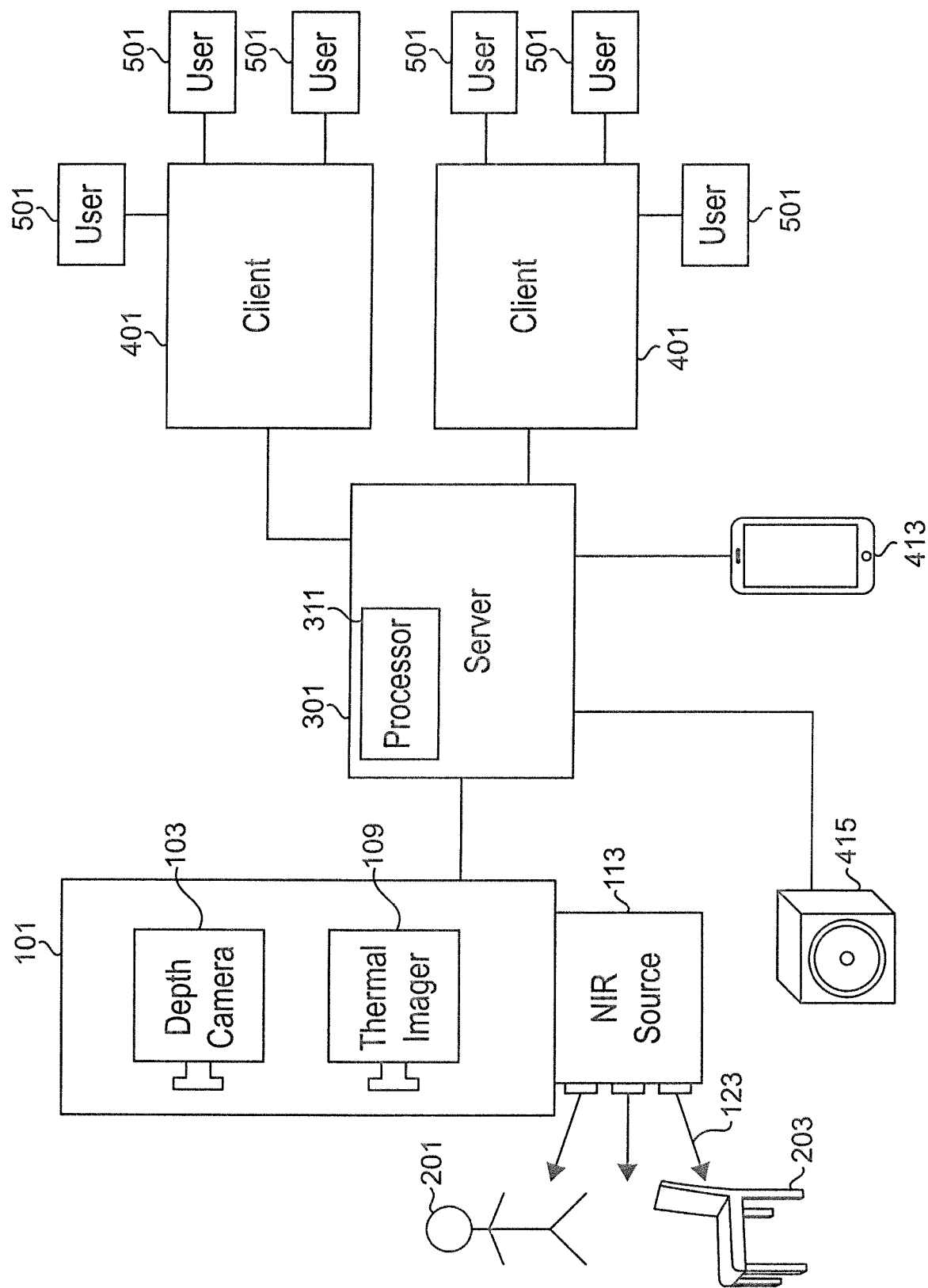

SYSTEMS AND METHODS FOR USE IN DETECTING FALLS UTILIZING THERMAL SENSING

CROSS REFERENCE TO RELATED APPLICATION(S)

This application is a Continuation of U.S. Utility patent application Ser. No. 15/634,520, filed Jun. 27, 2017, and claims benefit of U.S. Provisional Patent Application Ser. No. 62/355,728 filed Jun. 28, 2016. The entire disclosure of all the above documents is herein incorporated by reference.

BACKGROUND OF THE INVENTION

1. Field of the Invention

This disclosure relates to systems for automatically assessing whether an individual observed by the system has suffered a fall while they are within a particular environment. The disclosure particularly relates to using thermal sensing in such a system to better segregate a falling patient from a falling non-patient object.

2. Description of the Related Art

Watching a toddler learn to walk, one may find it difficult to believe that falling can be one of the most dangerous things that can happen to a human being. While children are known to fall down on what seems to be a near constant basis and generally jump right back up, as one ages the potential damage from a fall can go up dramatically.

When people discuss fall risk and the dangers of falls, they are generally talking about the risks for the elderly, which is a term commonly used to refer to those over age 65. That population is often much more susceptible to body damage from a fall, more likely to be unable to get help for themselves after a fall, and is more likely to suffer from falls as well. This population can be prone to increased falls from a myriad of problems such as worsening eyesight (e.g. due to issues such as presbyopia), decreases in muscle mass and reduced strength, and from taking medications which may induce dizziness or vertigo. Further this population is often more susceptible to damage from falls due to weakening of bones and lack of musculature which means that an impact from a fall is more likely to do more serious damage. Finally, as many of them live alone or away from caregivers for extended periods of time, when they fall, they often cannot get to a phone or other external connection to get help.

Falls in the elderly can be a substantial problem. It has been estimated that falls are the leading cause of both fatal and nonfatal injuries in the elderly and are one of the primary causes of broken bones (particularly hips) and head trauma. It has been estimated that 33% of the elderly will fall every year and that a third of those who fall will suffer moderate to severe injuries (or even death) because of the fall. This means that those who house or serve the elderly on a regular basis need to be constantly vigilant for the potential for falls and respond to them quickly so that any injuries incurred can be treated before they are made worse by the passage of time.

Even outside of concerns about the elderly, falls can still present a major concern. This is particularly true in medical and hospital settings. In these settings, even normally able-bodied people can be susceptible to a dramatically increased risk of falls and the elderly (who often require more medical attention) can be particularly susceptible. Treatments and medications (most notably anesthetics and pain killers) used in medical settings can make patients dizzy, nauseous, or confused leading to them having a greatly heightened risk of falls. Further, injuries or symptoms which sent the person to the hospital in the first place (for example muscle weakness, damaged bones, or pain) can make a patient more susceptible to falls as well.

The susceptibility of the patient population to falls is also combined with institutional issues with hospitals and other medical facilities which can increase fall risk and severity. Hospitals often have smooth surfaced, and very hard, floors for easy cleaning and disinfection, but this can also make them slippery and more likely to cause injury. Further, hospital equipment is often bulky, but needs to be placed in close proximity to patient areas to make it accessible quickly which can reduce open areas and require more complicated navigation. Finally, since a hospital is generally a foreign environment to the patient, they are also susceptible to simple lack of familiarity and can misestimate the size and shape of steps or pathways resulting in a fall.

Falls for hospitalized patients are believed to present 30-40% of safety incidents within any hospital and will generally occur at a rate of 4-14 for every 1000 patient days at a hospital. For even a relatively small facility, this can lead to multiple fall incidents every month, and can make them a near daily occurrence for a large institution. While institutions will typically utilize systems that allow them to try and reduce the number of falls that occur (for example, requiring patients to be moved using wheelchairs), the fact that falls will occur to at least some patients in a facility is unavoidable. By humans utilizing bipedal upright motion, some people will, in any given time window, suffer a fall.

Because of the fact that complete prevention of falls is essentially an impossible dream, there is a recognition that while a reduction in the number of falls is desirable, it is also important to make sure that falls are quickly responded to. Falling, particularly in an institutional setting, can often be an indicator of a secondary, and potentially more serious, issue. While falls can be caused by simple movement miscalculation (walking upright has actually been characterized by some scientists as simply controlled falling), they can also be caused by loss of consciousness, dizziness, loss of motor control, or lack of strength which can be indicators of major medical conditions such as a stroke. Further, as a fall can result in further injury, it is desirable to make sure that those injuries are quickly recognized and treated. A patient who suffered a fall could, for example, tear stiches from prior surgery resulting in bleeding. This scenario is readily treated if detected quickly, but it can be dangerous or deadly if not. In institutional settings where the population is often more susceptible to falls and more likely to suffer injury from a fall, detecting that an individual has suffered a fall so that aid can be provided to them quickly can be very important to mitigate the effects of the fall.

Because basic privacy concerns, and manpower issues, will generally prevent institutional personnel from watching every patient all the time, various automated systems have been proposed to try and both assess fall risk and to detect falls. U.S. patent application Ser. No. 13/871,816, the entire disclosure of which is herein incorporated by reference, provides for a system for fall detection and risk assessment which externally analyzes gait parameters of a patient to evaluate both their likelihood of fall risk and to notify a caregiver if a fall is detected.

The systems described in U.S. patent application Ser. No. 13/871,816 utilize a depth camera or other device which can obtain depth image data to analyze an individual's gait.

Image analysis, such as is described in that application, effectively requires 3-Dimensional ("3D") image data, which is why a depth camera is used. Image analysis can be very valuable in fall risk assessment as certain elements of gait, and changes in gait, can indicate increased likelihood of falling. Further, certain actions in a gait (such as the motion of stumbling) can be immediate indicators of a dramatically increased immediate fall risk or, upon analysis of the 3D image data, that a fall has occurred or is occurring. Machines can generally automatically detect that such a fall has occurred based on the movement of the patient and immediately notify caregivers to come to their aid.

Throughout this disclosure, it should be recognized that there are generally two different types of issues related to falls. A person's fall risk is the likelihood that a person will fall at some time during their stay in an institution. Generally, any person that can stand is at a non-zero fall risk as even completely able-bodied individuals can trip and fall unexpectedly. This application is not primarily concerned with determining fall risk and preventing falls. Instead, it is concerned with detection that an individual has fallen so that aid can be provided to the fallen individual quickly.

To provide aid as quickly as possible after a fall and potentially mitigate the effects from a fall, it is generally important that the caregiver be notified that a patient has fallen very quickly (e.g. in real-time or near real-time) after the person has fallen and the system has identified that a fall has occurred. Further, because of the nature of the notification, a caregiver will generally need to act quickly on the notification, moving to the area where the patient is to assist them. Because of this, it is extremely important that a system for detecting falls not issue a large number of false positive detections. False positives can have the effect of "crying wolf" on the caregivers, and result in them not responding as quickly to an indication of a patient having fallen, resulting in a more negative outcome.

At the same time, a system for detecting falls is not particularly valuable if it generates false negatives. Where a patient has already fallen, it is very important that the system detect this status quickly and relay information that the fall has occurred to caregivers. If a patient falls and the fall is not detected close to the time the patient falls, the patient may not be able to move in a fashion that the system would detect as a patient, and therefore the system may not detect that the patient needs care for a very long time which could result in a very dangerous situation. In effect, a patient that has already fallen is essentially a very low fall risk because they are generally not standing and, therefore, cannot fall. Thus, if the initial fall is not detected as a fall, the system is unlikely to know to send caregivers at a later time.

SUMMARY OF THE INVENTION

The following is a summary of the invention, which should provide to the reader a basic understanding of some aspects of the invention. This summary is not intended to identify critical elements of the invention or in any way to delineate the scope of the invention. The sole purpose of this summary is to present in simplified text some aspects of the invention as a prelude to the more detailed description presented below.

Because of these and other problems in the art, there is a need for improved sensor systems for use in detecting falls that can eliminate or reduce either false negatives and/or false positives so as to make the system more accurate.

Described herein, among other things, is a method of determining if a human being has fallen and an associated system, the method comprising: providing a monitor including a depth camera and a thermal sensor operatively coupled to a processor for interpreting the output of both the depth camera and the thermal sensor; the depth camera imaging a first point cloud; the depth camera imaging a separation of a portion of the first point cloud from the first point cloud; the processor determining from the imaging of the separation that the portion's separation is indicative of the portion falling; the thermal sensor imaging heat emitted by the portion and the first point cloud; and the processor determining that a human being has fallen only if the portion includes greater heat emitted than the first point cloud.

In an embodiment of the method and system, the depth camera is a near-infrared (NIR) camera.

In an embodiment of the method and system, the monitor also includes an NIR light source.

In an embodiment of the method and system, the thermnnal sensor is an infrared camera.

In an embodiment of the method and system, the thermal sensor is a long-wave infrared (LWIR) camera.

BRIEF DESCRIPTION OF THE DRAWINGS

FIG. 1 provides a general block diagram of an embodiment of a system for detecting falls utilizing thermal sensing.

DETAILED DESCRIPTION OF THE PREFERRED EMBODIMENT(S)

Throughout this disclosure, certain terms will generally be considered to have certain meaning. While not limiting the definition of these terms as would be understood to one of ordinary skill, the following can assist in understanding the operation of the systems and methods.

The term "computer" as used herein describes hardware which generally implements functionality provided by digital computing technology, particularly computing functionality associated with microprocessors. The term "computer" is not intended to be limited to any specific type of computing device, but it is intended to be inclusive of all computational devices including, but not limited to: processing devices, microprocessors, personal computers, desktop computers, laptop computers, workstations, terminals, servers, clients, portable computers, handheld computers, smart phones, tablet computers, mobile devices, server farms, hardware appliances, minicomputers, mainframe computers, video game consoles, handheld video game products, and wearable computing devices including but not limited to eyewear, wristwear, pendants, and clip-on devices.

As used herein, a "computer" is necessarily an abstraction of the functionality provided by a single computer device outfitted with the hardware and accessories typical of computers in a particular role. By way of example and not limitation, the term "computer" in reference to a laptop computer would be understood by one of ordinary skill in the art to include the functionality provided by pointer-based input devices, such as a mouse or track pad, whereas the term "computer" used in reference to an enterprise-class server would be understood by one of ordinary skill in the art to include the functionality provided by redundant systems, such as RAID drives and dual power supplies.

It is also well known to those of ordinary skill in the art that the functionality of a single computer may be distributed across a number of individual machines. This distribution may be functional, as where specific machines perform specific tasks; or, balanced, as where each machine is capable of performing most or all functions of any other machine and is assigned tasks based on its available resources at a point in time. Thus, the term "computer" as used herein, can refer to a single, standalone, self-contained device or to a plurality of machines working together or independently, including without limitation: a network server farm, "cloud" computing system, software-as-a-service, or other distributed or collaborative computer networks.

Those of ordinary skill in the art also appreciate that some devices which are not conventionally thought of as "computers" nevertheless exhibit the characteristics of a "computer" in certain contexts. Where such a device is performing the functions of a "computer" as described herein, the term "computer" includes such devices to that extent. Devices of this type include but are not limited to: network hardware, print servers, file servers, NAS and SAN, load balancers, and any other hardware capable of interacting with the systems and methods described herein in the matter of a conventional "computer."

For purposes of this disclosure, there will also be significant discussion of a special type of computer referred to as a "mobile device". A mobile device may be, but is not limited to, a smart phone, tablet PC, e-reader, or any other type of mobile computer. Generally speaking, the mobile device is network-enabled and communicating with a server system providing services over a telecommunication or other infrastructure network. A mobile device is essentially a mobile computer, but one which is commonly not associated with any particular location, is also commonly carried on a user's person, and usually is in constant communication with a network.

Throughout this disclosure, the term "software" refers to code objects, program logic, command structures, data structures and definitions, source code, executable and/or binary files, machine code, object code, compiled libraries, implementations, algorithms, libraries, or any instruction or set of instructions capable of being executed by a computer processor, or capable of being converted into a form capable of being executed by a computer processor, including without limitation virtual processors, or by the use of run-time environments, virtual machines, and/or interpreters. Those of ordinary skill in the art recognize that software can be wired or embedded into hardware, including without limitation onto a microchip, and still be considered "software" within the meaning of this disclosure. For purposes of this disclosure, software includes without limitation: instructions stored or storable in RAM, ROM, flash memory BIOS, CMOS, mother and daughter board circuitry, hardware controllers, USB controllers or hosts, peripheral devices and controllers, video cards, audio controllers, network cards, Bluetooth® and other wireless communication devices, virtual memory, storage devices and associated controllers, firmware, and device drivers. The systems and methods described here are contemplated to use computers and computer software typically stored in a computer- or machine-readable storage medium or memory.

Throughout this disclosure, terms used herein to describe or reference media holding software, including without limitation terms such as "media," "storage media," and "memory," may include or exclude transitory media such as signals and carrier waves.

Throughout this disclosure, the term "network" generally refers to a voice, data, or other telecommunications network over which computers communicate with each other. The term "server" generally refers to a computer providing a service over a network, and a "client" generally refers to a computer accessing or using a service provided by a server over a network. Those having ordinary skill in the art will appreciate that the terms "server" and "client" may refer to hardware, software, and/or a combination of hardware and software, depending on context. Those having ordinary skill in the art will further appreciate that the terms "server" and "client" may refer to endpoints of a network communication or network connection, including but not necessarily limited to a network socket connection. Those having ordinary skill in the art will further appreciate that a "server" may comprise a plurality of software and/or hardware servers delivering a service or set of services. Those having ordinary skill in the art will further appreciate that the term "host" may, in noun form, refer to an endpoint of a network communication or network (e.g. "a remote host"), or may, in verb form, refer to a server providing a service over a network ("hosts a website"), or an access point for a service over a network.

Throughout this disclosure, the term "real-time" generally refers to software performance and/or response time within operational deadlines that are effectively generally cotemporaneous with a reference event in the ordinary user perception of the passage of time for a particular operational context. Those of ordinary skill in the art understand that "real-time" does not necessarily mean a system performs or responds immediately or instantaneously. For example, those having ordinary skill in the art understand that, where the operational context is a graphical user interface, "real-time" normally implies a response time of about one second of actual time for at least some manner of response from the system, with milliseconds or microseconds being preferable. However, those having ordinary skill in the art also understand that, under other operational contexts, a system operating in "real-time" may exhibit delays longer than one second, such as where network operations are involved which may include multiple devices and/or additional processing on a particular device or between devices, or multiple point-to-point round-trips for data exchange among devices. Those of ordinary skill in the art will further understand the distinction between "real-time" performance by a computer system as compared to "real-time" performance by a human or plurality of humans. Performance of certain methods or functions in real-time may be impossible for a human, but possible for a computer. Even where a human or plurality of humans could eventually produce the same or similar output as a computerized system, the amount of time required would render the output worthless or irrelevant because the time required is longer than how long a consumer of the output would wait for the output, or because the number and/or complexity of the calculations, the commercial value of the output would be exceeded by the cost of producing it.

As discussed herein, the system and methods generally are designed to detect falls from a patient in a hospital setting, a resident in a senior living community, or a person in a home setting. That is, they operate within a controlled environment and as such relate to detecting a fall while the patient is within that environment. While this is not required and any setting can utilize the systems and methods, these settings generally provide concerns for increased fall risk. Further, the systems and methods generally provide for the indication that a fall has been detected to be relayed to a remote caregiver or monitor. As such, they are very useful for allowing a smaller number of personnel to monitor a patient population generally considered to be at a heightened risk for falls and fall related injury.

The fall detection methods discussed herein are generally performed by a computer system (10) such as that shown in the embodiment of FIG. 1. The system (10) comprises a computer network which includes a central server system (301) serving information to a number of clients (401) which can be accessed by users (501). The users are generally humans who are capable of reacting to a fall as part of their job or task description. Thus, the users will commonly be medical personal, corporate officers, or risk management personnel associated with the environment being monitored, or even the patient themselves or family members or guardians.

In order to detect a fall, the server (301) will take in a variety of information from a plurality of sensors (101) which will provide various indications of the person's current actions. From those sensors' (101) output, a variety of characteristics considering if movement appears to correspond to a patient (201) falling can be determined. These characteristics may then be processed by the server (301) to produce a determination if a fall has occurred. This determination is then passed on to the appropriate client(s) (401) and user(s) (501) for them to react to.

The system (10) can also provide feedback to mobile devices (413), such the smartphone of a patient's doctor who may not be currently at a computer. Similarly, information or requests for feedback may be provided to a patient (201) directly. For example, if a patient (201) is detected as having fallen, the system may activate a communication system (415) in the patient's (201) room asking them to indicate if they have fallen. This can allow a patient (201) to rapidly cancel a false alarm, or to confirm if they are in need of immediate aid.

An important aspect of the detection system (10) is that generally none of the sensors (101) are tethered to the patient (201). That is that the patient (201) does not need to wear any sensor or comply with any protocol for the fall to be detected. This allows for the system (10) to be institutional and to monitor any, and generally all, patients (201) in the facility environment at all times. It also allows for the system (10) to not require the patient (201) to be setup on the system (10) in order for it to begin monitoring. Instead, monitoring can begin of any individual as soon as they are present in the facility or in the sensing range of the sensors (101). Still further, it eliminates concern of a patient (201) forgetting to take a monitor with them and rendering the system (10) impotent to detect them and even allows the system to monitor those present if they are not patients (201), but are otherwise present in the facility.

The systems and methods discussed herein are designed to detect a human being falling as opposed to an inanimate object. Generally, the systems and methods will utilize a depth camera, which will often image in the NIR spectrum to detect a falling thing. The portion detected as a falling object will often be detected as separating from a point cloud indicative of one object in contact with another. Should such a separation be detected, the systems and methods will utilize a thermal sensor, often a camera imaging in the LWIR spectrum, to determine if the falling portion has a heat signature indicative of a human being. The thermal sensor can also be used to determine if any object detected as falling, even if not separating from another point cloud, by evaluating the heat signature to determine if it is indicative of a human.

FIG. 1 provides an overview of a system (10) and can be used to illustrate how the determination of a fall will generally work. The first element is the sensor array (101) which is used to monitor the patient (201). In order to untether the patient (201) from the system (10), these sensors (101) will generally be remote from the patient (201) (e.g. not located on their person or carried by them). Instead, they are generally located in areas where the patient (201) is likely to be. The first, and generally primary, sensor is a depth camera (103) for capturing depth image data.

In an embodiment, the depth camera (103) will comprise a camera which takes video or similar image-over-time data to capture depth image data. Specifically, this provides for 3D "point clouds" which are representative of objects in the viewing range and angle of the camera (103). Operation of depth cameras (103) is generally well known to those of ordinary skill in the art and is also discussed in U.S. patent application Ser. No. 13/871,816, the entire disclosure of which is herein incorporated by reference, amongst other places. In order to provide for increased privacy, the depth camera (103) may utilize silhouette processing as discussed in U.S. patent application Ser. No. 12/791,496, the entire disclosure of which is herein incorporated by reference. To deal with monitoring at night or under certain other low conditions, the depth camera (103) may utilize recording optics for recording the patient in an electromagnetic spectrum outside of human vision. That is, the camera (103), in an embodiment, may record in the infra-red or ultra-violet portions of the spectrum.

It is preferred that the camera (103) utilize an infrared (IR) sensitive camera (and particularly a near-infrared (NIR) camera) utilizing active imaging and an IR light source (113). This can allow for active imaging even at night by providing an NIR light source (113) in the room and collecting images in primarily the NIR band. As the NIR light (123) is not detected by the human eye, the room is still dark to the patient (201) while the NIR camera (103) can still image clearly.

The camera (103) will generally utilize video or other multiple frame-over-time recording processes to search for patterns in motion that can be indicative of a fall having previously occurred. Specifically, the camera (103) image will generally be processed to provide for a variety of the elements and variables used in the fall determination. Specifically, the camera (103) will generally be interested in moving objects whose movement ceases or dramatically changes as these represent potential falls.

While the depth capturing camera (103) can operate in a variety of ways, in an embodiment the camera (103) will capture an image and the processor (311) will obtain the image, in real-time or near real-time from the camera (103) and begin to process the images. Initially, foreground objects, represented as a three dimensional (3D) point cloud (a set of points in three dimensional space), can be identified from the depth image data using a dynamic background subtraction technique followed by projection of the depth data to 3D. Generally, objects in the foreground which are moving are considered to be of interest as these can potentially represent a patient (201) in the room. In FIG. 1, the image includes two foreground objects: the patient (201) and a chair (203).

A tracking algorithm can then be used to track foreground objects over time (generating a path history) and indicating that objects are moving. Walking sequences can then be identified from the path history of a tracked object by identifying sections of the history during which the object's movement met a set of criteria such as maintaining a minimum speed for at least a minimum duration and covering at least a minimum distance. Such walking sequences can then be processed to generate temporal and spatial gait parameters, including walking speed, average speed, peak speed, stride time, stride length, and height, among others. As indicated above, U.S. patent application Ser. Nos. 12/791,496 and 13/871,816 provide examples of how depth image information may be processed to provide gait and other stability information. Alternatively, objects (201) and (203) can simply be classified as either moving or not moving across any particular number of frames recorded by the camera (103).

One problem with detecting falls in hospital rooms, or in other rooms with beds, chairs (203), or similar pieces of furniture, is that there are generally a number of objects on the furniture which can fall from the furniture and which may appear as a falling individual in collected sensor data, including data from the camera (103), even if they are not a patient (201). This can include items such as pillows or blankets. The furniture itself may also move under certain circumstances. For example, chairs may roll on castors or curtains in the room may move in a breeze. Algorithms for detecting a patient (201) exiting a bed or chair (203) can incorrectly detect a fall if the patient (201) has been in the bed or chair (203) for a period of time so that in the depth camera (103) image they appear merged with surrounding objects and have now become part of the background information. Alternatively, the chair (203) and patient (201) could have merged into a single foreground object due to their proximity even if the patient has continued to be in motion. This can make it difficult to detect which point cloud portion is the patient (201) versus the chair (203) or an object on the chair (such as a blanket) as the objects begin to separate when the user moves.

Objects merging into the background or each other in a depth camera (103) image is particularly problematic in fall detection because it is reasonably likely that an object, such as bedding, could fall from a bed while the patient (201) is still on the bed. As the camera (103) evaluates moving objects, an object which suddenly separates from the bed and falls to the floor can be detected as a falling patient (201). Similar problems can also occur where a privacy curtain is suddenly moved by a breeze or where another object in the room suddenly has motion which then ceases. This latter case can occur, for example, if a patient left the viewing area but dropped a large package within the viewing area as they were doing so.

This type of false positive is particularly likely because the algorithms for fall detection generally work backward from the final fall position, to evaluate movement leading up to that position, to determine if a fall has occurred. That is, the algorithms recognize that a moving object (point cloud) is no longer moving, and thus go backward to evaluate the nature of the motion for a few seconds prior to the motion ceasing. If this movement is indicative of falling (e.g. it is downward) this can trigger a fall determination. Thus, a falling pillow or blanket can greatly resemble a falling patient when one looks at the final position of the pillow (on the floor) and evaluates what it did in the frames leading up to that point (fall from the bed to the floor).

Further, it can be difficult for the camera (103) to segregate a falling pillow from a falling patient (201) because there is not necessarily enough walking movement or other information prior to the fall for the camera (103) to use walking behavior or other algorithms to evaluate the general form and shape of the object to determine if it is a likely humanoid. The object became a foreground object of interest because it fell. Further, when methods such as those contemplated in U.S. patent application Ser. No. 12/791,496 for blurring of images and image edges to maintain privacy are being used, depth images can have a hard time determining a rolled or balled human shape, versus it being the shape of an inanimate object such as a pillow, or a combination of both.

The vast majority of these false positives in fall detection are believed to result from two specific facets of the fall detection. The first is that the depth camera (103) image processing is generally looking at objects which are moving, and which then stop moving (at least in some dimensions or respects) in a position indicative of having fallen to the floor to locate a fall. The system then goes backward from the fall position, to evaluate the movement to see if it is indicative of a fall. Thus, an inanimate object in the frame which falls can provide for a very likely false positive because this is precisely how they move.

The second reason for false positives is that a patient (201) in the room which is not moving (such as when they are asleep) generally needs to become part of the background. If the camera (103) and processor (311) evaluated every object in the frame which was once moving, it would require a lot more computational power, but could also generate a large number of false signals. An object, such as chair (103), moved into the room should not be monitored simply because it once moved and the computation will become bogged down in useless information. However, by allowing objects to become part of the background when they have not moved in a certain amount of time, it now becomes possible for the patient (201) to be lost in the image. This is most commonly because the patient (201) is now in a position (such as in bed or sitting in a chair (203)) where they are not moving and their point cloud has merged with the cloud of the object (203).

The merging of point clouds creates the problem with object merging in the image. Effectively, the patient (201) and chair (203) are now a single object to the depth camera (103) (or no object if they have become part of the background). When the patient (201) stands, the single object becomes two (or one with a part moving) and it is necessary to quickly asses which is the patient (201) and which is of chair (203). As many falls occur at the time that a stationary object starts moving (e.g. as the patient (201) stands from sitting) if the moving object (or object portion) is not quickly assessed as the patient (201), it is possible that the system (10) will not detect a patient (201) who stands and quickly falls. This creates a likely (and highly dangerous) false negative situation.

As indicated above, however, the problem is that a patient (201) that starts to stand from sitting and quickly falls, depending on the precise angle of the chair (203), can look very similar to a blanket on the patient's (201) legs slipping off and falling when a patient (201) turns in their sleep. It is, thus, desirable to be able to determine where the patient is within a merged point cloud where a portion of the cloud beings moving.

In order to assist in segregating the patient image from surrounding objects, the system (10) utilizes a long-wave infrared (LWIR) camera (109) in combination with depth camera (103). As LWIR cameras (109) can see heat to a degree and can generally identify and separate a heat producing object from one which does not produce heat, they can commonly separate out portions of the patient's (201) body as it will produce heat while surroundings will not. As opposed to NIR cameras, LWIR cameras (109) image the radiation of heat at essentially any temperature. While heated objects can emit wavelengths in the NIR and visible light spectrums, these heated objects often have to be heated to greater than 250° C. in order to be detected from emission in the NIR or visible spectrums. For the purposes of detecting warm blooded animals and many common everyday heat emitting objects, such as humans, this temperature range cannot be used and it is necessary to detect heat more in the range of 0°-100° C.

LWIR cameras (109) are generally not capable of acting as a depth camera (103), however. Specifically, because LWIR cameras (109) visualize heat emission and reflectance of an object, the output of an LWIR camera (109) in determining the actual heat of the object generally requires some knowledge of the material of which the object is made (since the objects are not actually perfect black box emitters). Further, LWIR cameras (109) can have trouble generating depth information since they are not utilizing reflected light, but generated heat.

The sitting scenario is particularly apt at showing the concern because a patient (201) getting up or turning over may knock blankets or pillows unto the floor. Thus, as the initial singular image cloud of the patient (201), chair (203), and blanket splits into multiple images, one or part of those images is seen as having fallen. The system (10) needs to determine if the fallen object is the chair (203) tipping over, the blanket falling off the patient, or the patient (201). The NIR depth camera (103) may be unable to determine which part of the point cloud (or which point cloud if they have actually separated) is the patient quickly and without more information as each point cloud could show aspects of both being and not being the patient (201).

To avoid these problems, the present system (10) includes use of an accurate remote temperature (LWIR or thermal) sensor or camera (109). The thermal sensor (109) is tasked with quickly evaluating the point cloud(s) to determine where the patient (201) is within the point cloud(s) based on their heat emission. It is important that their heat emission is not so much their shape as is performed by the depth camera (103), but is simply an evaluation of their heat radiation pattern. The thermal sensor (109) may be used in conjunction with a standard 3D imaging camera in the visual spectrum (103), or with an NIR camera (103), or both. As opposed to an NIR camera (103), which in an embodiment of the present systems still utilizes a 3D depth image to evaluate the shape and movement of NIR emitting or reflecting objects, the temperature sensor (109) is tasked with simply evaluating the temperature characteristics of the objects and will commonly be tasked with evaluating relative temperature characteristics between objects.

Generally, the LWIR camera (109) will be co-located with, or very close to the NIR depth camera (103). In this way, the LWIR image can be superimposed onto each point cloud image generated by the NIR camera (103) providing parts of certain clouds with a heat signature. Because humans emit heat, bare skin will generally be visible to an LWIR camera (109). As most humans in their daily lives are not completely covered with clothing or other objects (which can block LWIR emissions if they are loose fitting or newly put on), at least patches of LWIR emission will commonly be parts of the patient (201), and an entire patient may be visible if they are wearing clothing that has been on sufficient time to be warmed. These heated portions can be used to indicate that a cloud to which the heated element is at least partially superimposed is likely that of a patient (201). In this way, it can be possible to treat an image which includes a human (even if it also includes another object) as including a human and thus being the location of patient (201).

This joint imaging can allow, for example, for the processor (311) to determine that the point cloud of a chair (203) and patient (201) includes the patient (201) which is the element of interest. The fact that the cloud may also include the chair (203), is not important. What is important is that the cloud of interest includes the patient (201). By using thermal detection related to specific thermal characteristics of a patient (201) versus other items in the room that do not emit LWIR energy, the differences between a point cloud which includes the patient (201) versus one that does not can more rapidly be determined and the patient (201) quickly detected from a merged cloud in the event of cloud separation.

To illustrate the operation, let us assume that patient (201) has been sitting in chair (203) sufficiently long that the depth camera (103) has a single point cloud of the two together at the instant something in that point cloud starts moving. The movement causes the depth camera (103) to treat this cloud (or at least a portion of it) as an object of interest. The depth camera (103) also detects that the moving piece of the cloud has fallen to the floor. The question at this time for the processor (311) is if the moving piece of the point cloud (which may be its own point cloud) did or did not include the patient (201). Traditionally, this was all the information the processor (311) had to work with.

In the present system (10), if the falling portion of the point cloud does not include a heat emitter, it is likely that the falling object detected is not patient (201). The evaluation is reinforced if a portion of the same cloud, or a nearby cloud, which did not move does include a heat emitter. This scenario implies that the patient (201) is still in the chair (203) and the moving point cloud was an object previously in the chair. Similarly, if the falling portion of the point cloud does include a heat emitter, it is more likely that the patient (201) fell out of the chair (203). This is reinforced if there are no, or fewer, heat emitters in the remaining portion of the cloud than there were prior to the motion being detected or if the heat emitters are generally now closer to the floor than they were previously.

It should be recognized that in an embodiment, the task of the thermal sensor (109) can be performed by a camera (103) in addition to generating depth image data by combining both sensors (101) in a common housing and using software to analyze the different incoming wavelengths. This allows for the hardware function of a separate temperature sensor (109) to be implemented using appropriate control software operating on processor (311) and controlling the joint camera (103) and (109).

While the above is focused on the separation of a merged point cloud including the patient (201), it should be recognized that combining of an image of the patient (201) with another object is also an element of interest. For example, draperies or a chair (203) can be objects that an individual's 3D cloud image could merge and then separate from and the patient's passage can cause these objects to move and that movement to then cease. This could give a false indication of a fall as those moved objects come to rest after the patient (201) passage. However, as the objects will not emit heat due to the patient's passage, they will commonly be rapidly ignored once the patient is sufficient distance from them to result in a separate point cloud. Similarly, should a patient (201) fall into another object such as chair (203), the resultant point cloud may not look like the patient (201) has fallen if the whole cloud is analyzed for prior movement. However, as the portion of the cloud which includes the heat emitter can be separately considered, a fall can be detected here as well.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

The invention claimed is:

1. A monitor for determining if a human being has fallen, the monitor comprising:
   a means for imaging depth in a first point cloud and a second point cloud comprising a separated portion of said first point cloud;
   a means for interpreting output of said means for imaging depth and determining from said imaging of said second point cloud that motion of said second point cloud is indicative of said separated portion falling;
   a means for imaging emitted heat from said first point cloud and said second point cloud;
   a means for comparing emitted heat from said first point cloud to emitted heat from said second point cloud; and
   a means for determining that a human being has fallen only if said second point cloud includes greater heat emitted than said first point cloud.

2. The monitor of claim 1, wherein said means for imaging depth comprises a depth camera.

3. The monitor of claim 2, wherein said depth camera is a near-infrared (NIR) camera.

4. The monitor of claim 3, wherein said monitor also includes a means for emitting NIR light.

5. The monitor of claim 4, wherein said means for imaging emitted heat comprises a thermal sensor.

6. The monitor of claim 5, wherein said thermal sensor is a long-wave infrared (LWIR) camera.

7. The monitor of claim 1, wherein said means for imaging heat is a long-wave infrared (LWIR) camera.

8. The monitor of claim 1, wherein said means for determining comprises a computer.

* * * * *